United States Patent
Wohnlich et al.

[15] 3,654,411
[45] Apr. 4, 1972

[54] BREAK-AWAY SWITCH

[72] Inventors: Joseph F. Wohnlich, Warren; Donald L. Endsley, Marion, both of Ind.

[73] Assignee: United Filtration Corporation, Chicago, Ill.

[22] Filed: Nov. 23, 1970

[21] Appl. No.: 91,941

[52] U.S. Cl. ........................................ 200/61.19, 200/51.1
[51] Int. Cl. ........................................................ H01h 27/04
[58] Field of Search ............. 200/61.19, 153 M, 51.09; 188/3 R, 3 H; 340/52, 282; 156/380

[56] References Cited

UNITED STATES PATENTS

| | | | |
|---|---|---|---|
| 2,844,675 | 7/1958 | Edgar | 200/61.19 |
| 3,485,982 | 12/1969 | Maire | 200/1 A |
| 1,658,832 | 2/1928 | Brown | 200/51.1 |
| 2,419,585 | 4/1947 | O'Brien et al. | 200/51.09 |
| 3,458,679 | 7/1969 | Russell et al. | 200/168 G |
| 2,763,742 | 9/1956 | Brooks et al. | 200/51.09 |
| 3,062,326 | 11/1962 | Jones et al. | 200/61.19 X |

Primary Examiner—Robert K. Schaefer
Assistant Examiner—M. Ginsburg
Attorney—Parker, Carter & Markey

[57] ABSTRACT

A break-away safety switch suitable for installation in the electrical system of a trailer for use in completing an electrical circuit to apply the brakes of the vehicle or to actuate an alarm. The switch is contained in a compact waterproof housing of low silhouette which is pivotally mounted on a trailer. The housing is formed of a pair of identical half sections of plastic which are fused together along a longitudinal mating periphery to seal the housing and thereby prevent corrosion of the electrical switch parts located therein. The wiring and break-away plunger enter the housing through openings located in the opposite ends thereof. The plunger is equipped with an O-ring to seal its opening into the housing. The electrical contacts of the switch are mounted on individual springs which are biased towards each other and held apart by the plunger.

3 Claims, 3 Drawing Figures

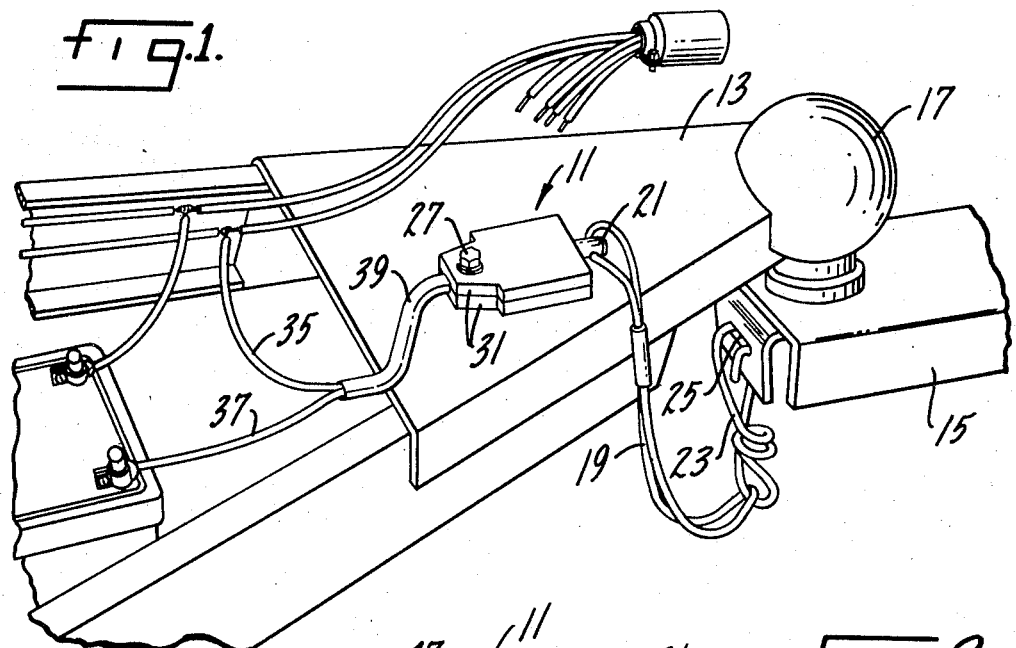
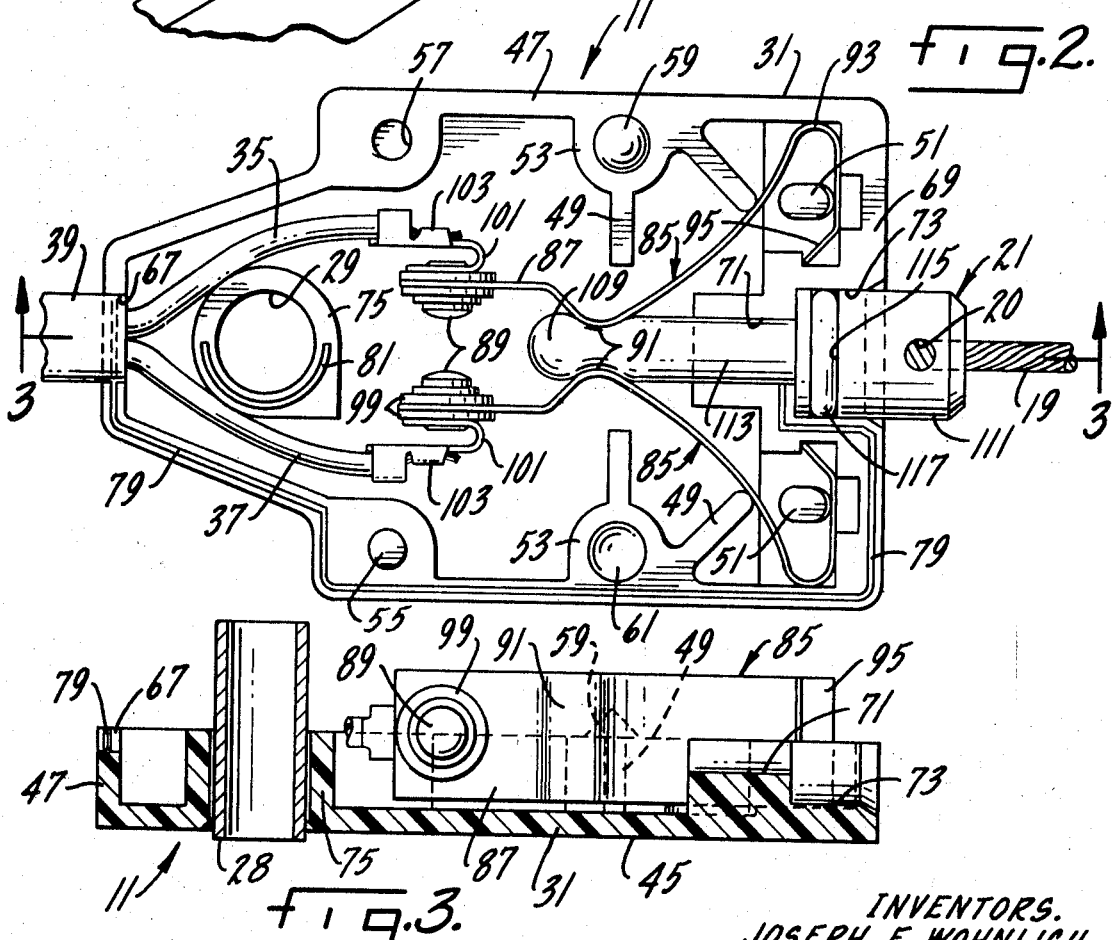
INVENTORS.
JOSEPH F. WOHNLICH
DONALD L. ENDSLEY
BY Parker, Carter & Markey
Attorneys.

BREAK-AWAY SWITCH

SUMMARY OF THE INVENTION

This invention is concerned with a break-away switch for a trailer and more particularly with such a switch that is intended to actuate an electrical circuit to apply the trailer brakes or to give a signal upon separation of the trailer from the towing vehicle.

An object of this invention is a break-away switch which is waterproof.

Another object is a break-away switch which is corrosion resistant.

Another object is a break-away switch which is compact and has a low silhouette for ease of mounting on a trailer and for reduced vulnerability to damage.

Another object is a break-away switch that is easily assembled.

Another object is a break-away switch in which the force applied to the housing upon separation of the plunger is not transmitted to the wiring leading into the housing.

Another object is a break-away switch which is pivotally mounted on a trailer so that forces applied to the plunger by the cable are always applied along the longitudinal axis of the plunger.

Other objects may be found in the following specification, claims and drawings.

BRIEF DESCRIPTION OF THE DRAWINGS

The invention is illustrated more or less diagrammatically in the following drawings wherein:

FIG. 1 is a partial perspective view of the break-away switch of this invention mounted on a trailer tongue;

FIG. 2 is an enlarged plan view of the switch with a housing half section removed; and FIG. 3 is a cross-sectional view taken along line 3—3 of FIG. 2 with parts omitted for clarity.

DESCRIPTION OF THE PREFERRED EMBODIMENT

FIG. 1 of the drawings shows the switch 11 of this invention mounted on a trailer tongue 13. The trailer tongue is connected to a towing vehicle 15 through means of a conventional ball and socket attachment 17. A wire cable loop 19 fits through an opening 20 in one end of a switch plunger 21. The wire cable loop also engages a clip 23 which fits into a slot 25 in the towing vehicle 15.

The switch 11 is connected to the trailer tongue by means of a bolt 27 which fits through a sleeve 28 positioned in aligned passages 29 in the switch housing half sections 31. Insulated wires 35 and 37 lead from the switch 11 to the trailer wiring system and trailer battery respectively. The insulated wires are covered by a sheathing 39.

As shown in FIG. 2, the housing for the switch 11 is formed of two identical, generally rectangular, half sections 31 of thermoplastic material. A thermoplastic material found suitable for this housing is an ABS resin of the type sold under the trademark "CYCOLAC" by Marbon Chemical Division of Borg-Warner Corporation. Each half section 31 is molded with a base or bottom wall 45 and upstanding peripheral walls 47. Additionally, upstanding partitions 49 and bosses 51 and 53 are molded integrally with the bases. Mating alignment projections and recesses are formed in the bosses and peripheral walls of the half sections. For example, cylindrical projection 55 of one half section mates with cylindrical recess 57 of the other half section while conical projection 59 mates with conical recess 61 when two identical half sections are joined together.

A semi-circular recess 67 is formed in the upstanding wall 47 at one end of the housing to cooperate with a similar recess in another half section to form an opening into the housing for the insulated wires 35 and 37. At the opposite end of the housing is a raised platform 69 formed integrally with the housing half section 31. Formed in this platform are two semi-cylindrical recesses 71 and 73 having a common axis and different diameters with the inner recess 71 being of smaller diameter than the outer recess 73. The semi-cylindrical recesses cooperate with similar recesses in the other half section 31 to form a passage for the plunger 21.

The passage 29 through a half section 31 is defined by an upstanding tubular wall 75. A welding bead 79 is formed on the upper surface of the peripheral wall 47 and extends about one half of the periphery of each half section 31. A similar bead 81 is formed around one half of the periphery of the upstanding tubular wall 75 surrounding the passage 29.

The passages formed by recesses 67, 71 and 73 are aligned and are located at opposite ends of the switch 11. The axis of the passage 29 intersects the axes of these passages generally at right angles thereto.

A pair of identical springs 85 are positioned in the switch 11. The springs are each of the flat metal type bent in a rather irregular configuration to provide a flat portion 87 at one end. Located in the flat portion 87 is an opening (not shown) which is adapted to receive and support an electrical contact 89. Formed adjacent the flat portion of the spring is a hump portion 91. Formed near the opposite end of the spring is a generally U-shaped portion 93 with an obliquely bent portion 95 at the far end thereof. The generally U-shaped portion of each spring fits around the boss 51 of the housing half section 31 and engages the peripheral wall 47 of the housing with the obliquely bent portion 95 engaging the raised platform 69 to secure the spring in position in the housing.

The contact 89 which is mounted in the straight portion 87 of the spring is insulated from the spring by non-conductive washers 99. The contacts 89 are connected respectively to their wires 35 and 37 by U-shaped conductors 101 and crimp fittings 103 with the U-shaped conductors being riveted to the contacts. It should be noted that the wires 35 and 37 which connect to the contacts 87 and 89 straddle the upstanding tubular walls 75 and the passage 29 that these walls define.

The plunger 21 has a bulbous tip 109 at one end and an enlarged cylindrical portion 111 at the opposite end. The bulbous tip and enlarged portion 111 are connected by an intermediate cylindrical portion 113. A groove 115 is formed in the enlarged cylindrical portion and an O-ring 117 is positioned in the groove. The O-ring contacts the walls of the recesses 73 of the housing half-sections 31 to form a waterproof seal around the plunger 21.

The use, operation and function of this invention are as follows:

The break-away safety switch of this invention is intended for use on a trailer to either actuate electrically operated brakes or to give a signal upon separation of the trailer from the towing vehicle. The switch 11 is compact in size having a very small height in comparison to its width and length in order to permit it to be readily fastened to a trailer and to reduce the vulnerability of the switch to mechanical injury.

The housing half sections 31 are fused together along a longitudinal mating periphery to seal the switch against moisture and thereby prevent corrosion of the electrical switch, wires and contacts located therein. The fusing of the identical half sections together may be accomplished by ultrasonically welding which fuses the beads 79 and 81 formed on the contacting portions of identical half sections. Since the beads not only extend around the peripheral walls 47 but also extend into the recesses 67 and 71 and walls 75 which form the passages into the housing for the wires 35, 37 and the plunger 21 and the passage through the housing for the mounting bolt 27, a continuous bead is formed around the entire periphery of the housing. Moisture is prevented from entering the switch housing around the plunger because of the provision of the O-ring 117 as part of the plunger. The sheathing 39 of the insulated wires 35 and 37 is also fused to the housing half section to prevent the entrance of moisture at this location.

The construction of this switch eliminates the need for a stress bushing where the wires 35, 37 and its sheathing 39 are attached to the housing half sections. This is accomplished by locating the attachment bolt 27 in alignment with the wire and plunger passages so that any force exerted on the housing due to removal of the plunger from contact with the springs 85 will be transferred to the bolt 27 and not to the wires 35, 37 or their sheathing 39. Because the sleeve 28 is longer than the passages 29 through the housing half sections 31 and because the sleeve fits loosely in these passages, the switch 11 will pivot about the attachment bolt 27 which extends through the sleeve and fastens the switch to the trailer. This means of attachment permits the switch 11 to pivot to automatically align the plunger 21 with the axis of the cable 19 whenever a force is applied to the cable. Thus, any force applied by the cable will always be applied along the longitudinal axis of the plunger insuring that the plunger will be pulled out of the switch whenever a sufficient force is exerted on the plunger. In this regard it should be noted that bolt 27 extends through the housing at right angles to the axes of the plunger and the wires 35, 37 and is positioned adjacent the end of the switch through which the wires extend.

Ease of assembly of the break-away switch is accomplished by dividing the spring means into separate springs 85 each of which can be inserted in a housing half section 31 after the wires 35 or 37 are connected to their respective contacts 89. The springs 85 are anchored in the housing half sections by means of their U-shaped portions 93 and obliquely bent portions 95 which engage portions of the housing half sections. With this construction, the need to form additional openings through the housing half sections to secure the spring to the housing is eliminated thus eliminating a possible source of moisture entering the sealed housing.

Assembly expenses are reduced because each of the housing half sections 31 is identical in construction. A complete housing may be assembled by first placing the springs 85, contacts 89 and connected wires 35 in a housing half section in the manner generally shown in FIG. 2. A complimentary housing half section is placed in mating contact with the first housing half section. The half sections are ultrasonically fused together by melting the beads 79 and 81 formed on the peripheral walls.

Whereas, the preferred form of the invention has been shown and described, it should be understood that many modifications and changes may be made to this embodiment without departing from the fundamental theme of the invention. Therefore, the scope of the invention should be limited only by the scope of the claims appended hereto.

We claim:

1. A break-away safety switch for installation in the electrical system of a trailer having electrically actuated brakes or an alarm supplied by a storage battery including:

a waterproof housing including a pair of identical generally rectangular half sections of plastic ultrasonically welded together along a longitudinally extending peripheral seam, longitudinally extending, axially aligned openings in the opposite ends of said housing with one opening for insulated electrical wires and the other opening for a break-away plunger, a pair of contacts, a pair of spring means biasing said contacts toward each other with said contacts being positioned in said housing and arranged to be held apart by said plunger inserted in said break-away plunger opening, and a trailer attachment bolt passage formed in said housing adjacent said wire opening with said bolt passage extending through said housing in alignment with said axially aligned openings and at right angles thereto.

2. The switch of claim 1 further characterized in that a sleeve is positioned in said trailer attachment bolt passage with said sleeve being loosely fitted therein and extending beyond the top and bottom of the switch housing to permit the switch housing to pivot about a bolt when inserted through said sleeve.

3. The switch of claim 1 further characterized in that said bolt passage is sealed from the interior of said housing.

* * * * *